(12) United States Patent
Hattori et al.

(10) Patent No.: US 9,948,165 B2
(45) Date of Patent: Apr. 17, 2018

(54) INVERTER-INTEGRATED ELECTRIC COMPRESSOR

(71) Applicant: MITSUBISHI HEAVY INDUSTRIES AUTOMOTIVE THERMAL SYSTEMS CO., LTD., Kiyosu-shi, Aichi (JP)

(72) Inventors: Makoto Hattori, Aichi (JP); Masahiko Asai, Aichi (JP)

(73) Assignee: MITSUBISHI HEAVY INDUSTRIES AUTOMOTIVE THERMAL SYSTEMS CO., LTD., Kiyosu-Shi (JP)

( * ) Notice: Subject to any disclaimer, the term of this patent is extended or adjusted under 35 U.S.C. 154(b) by 177 days.

(21) Appl. No.: 14/652,399

(22) PCT Filed: Jan. 8, 2014

(86) PCT No.: PCT/JP2014/050135
§ 371 (c)(1),
(2) Date: Jun. 15, 2015

(87) PCT Pub. No.: WO2014/129218
PCT Pub. Date: Aug. 28, 2014

(65) Prior Publication Data
US 2015/0333604 A1    Nov. 19, 2015

(30) Foreign Application Priority Data

Feb. 20, 2013  (JP) .................................. 2013-031407

(51) Int. Cl.
*H02K 5/00* (2006.01)
*H02K 5/04* (2006.01)
(Continued)

(52) U.S. Cl.
CPC .............. *H02K 11/33* (2016.01); *F04B 35/04* (2013.01); *F04B 39/121* (2013.01); *H02K 5/00* (2013.01);
(Continued)

(58) Field of Classification Search
CPC ........ H02K 11/33; H02K 11/38; H02K 11/04; H02K 11/048; H02K 11/30; H02K 11/00;
(Continued)

(56) References Cited

U.S. PATENT DOCUMENTS

2006/0120001 A1    6/2006  Weber et al.
2007/0231165 A1*  10/2007  Koide ................. F04B 27/0873
                                                     417/410.1
(Continued)

FOREIGN PATENT DOCUMENTS

CN    101187364 A    5/2006
CN    102203418 A    9/2011
(Continued)

OTHER PUBLICATIONS

Decision to Grant a Patent dated Sep. 20, 2016 for corresponding Japanese Patent Application No. 2013-031404 with an English Translation.
(Continued)

*Primary Examiner* — Bernard Rojas
*Assistant Examiner* — Alexander Singh
(74) *Attorney, Agent, or Firm* — Birch, Stewart, Kolasch & Birch, LLP

(57) ABSTRACT

Provided is an inverter-integrated electric compressor which has improved assembly properties and assembly precision, and improved productivity. In this inverter-integrated electric compressor, a P-N terminal is provided on the inverter device main substrate, and a power source-side cable can be connected to the P-N terminal by inserting a connector
(Continued)

provided at one end; by arranging and mounting multiple high-voltage electric components on the back of the main substrate in the area where the P-N terminal is arranged, a filter circuit is provided on the main substrate. The multiple high-voltage electric components are integrally coupled via fitting units provided on the housing cases of one another and are arranged in a prescribed position on the back of the main substrate with a positioning means provided on one of the housing cases.

4 Claims, 6 Drawing Sheets

(51) Int. Cl.

| | | |
|---|---|---|
| *H02K 11/33* | (2016.01) | |
| *H02K 5/22* | (2006.01) | |
| *H02K 11/30* | (2016.01) | |
| *H02K 11/38* | (2016.01) | |
| *F04B 35/04* | (2006.01) | |
| *F04B 39/12* | (2006.01) | |
| *H02M 7/00* | (2006.01) | |

(52) U.S. Cl.
CPC .............. *H02K 5/04* (2013.01); *H02K 5/22* (2013.01); *H02K 11/30* (2016.01); *H02K 11/38* (2016.01); *F04C 2240/808* (2013.01); *H02M 7/003* (2013.01)

(58) Field of Classification Search
CPC .. H02K 5/00; H02K 5/02; H02K 5/08; H02K 5/24; H02K 5/22; H02K 5/04; H02K 5/06; F04C 2240/808; H02M 7/00; H02M 7/003; H02M 7/42; F04B 35/04; F04B 39/121

USPC .............. 310/71, 68 D, 68 C, 68 R, 68 E, 89
See application file for complete search history.

(56) References Cited

U.S. PATENT DOCUMENTS

| | | |
|---|---|---|
| 2011/0193452 A1 | 8/2011 | Yakushiji |
| 2011/0211980 A1 | 9/2011 | Shibuya et al. |
| 2012/0045353 A1* | 2/2012 | Watanabe ............... F04B 35/04 417/410.1 |
| 2012/0286602 A1* | 11/2012 | Uchida ................... H02K 11/33 310/71 |

FOREIGN PATENT DOCUMENTS

| | | |
|---|---|---|
| DE | 10 2008 051 509 A1 | 4/2009 |
| DE | 11 2012 004 558 T5 | 10/2014 |
| EP | 1 034 983 A2 | 9/2000 |
| EP | 1 744 602 A2 | 1/2007 |
| JP | 11-135965 A | 5/1999 |
| JP | 2000-261160 A | 9/2000 |
| JP | 2005-36773 A | 2/2005 |
| JP | 2006-230064 A | 8/2006 |
| JP | 2007-295639 A | 11/2007 |
| JP | 2011-163232 A | 8/2011 |
| JP | 4898931 B2 | 3/2012 |
| JP | 2012-193660 A | 10/2012 |
| JP | 2012-209414 A | 10/2012 |

OTHER PUBLICATIONS

German Office Action dated Oct. 21, 2015 for German Patent Application No. 112014000405.7 with English Translation.
Chinese Office Action and Chinese Search Report, dated Nov. 30, 2016, for Chinese Application No. 201480003577.6 with English translations.

* cited by examiner

INVERTER-INTEGRATED ELECTRIC COMPRESSOR

TECHNICAL FIELD

The present invention relates to an inverter-integrated electric compressor having an inverter device integrally incorporated into a housing thereof.

BACKGROUND ART

Inverter-integrated electric compressors, which integrally incorporate inverter devices, are used as air conditioner compressors installed in electric vehicles, hybrid vehicles, and the like. This inverter-integrated electric compressor is configured so that high-voltage direct-current power supplied from a power source unit mounted on a vehicle is converted into three-phase alternating current power of required frequency by the inverter device, which is then applied to an electric motor so that the electric motor is driven.

The inverter device is constituted of a plurality of high-voltage electric components such as a coil and a capacitor constituting a noise removing filter circuit, a plurality of semiconductor switching elements such as IGBT constituting a switching circuit for converting power, an inverter circuit including the filter circuit and the switching circuit, and a substrate on which a control circuit of the inverter circuit is mounted, and is used to convert direct current power inputted via a P-N terminal into three-phase alternating current power and to output the three-phase alternating current power from a UWV terminal toward an electric motor. The inverter device is incorporated into an inverter housing section provided on an outer circumference of a housing of the electric compressor so that the inverter device is integrated.

A power-source-side cable for supplying direct current power from a power source to the inverter device, for example, as disclosed in Patent Literature 1, is configured to be connected, via a connector of the power-source-side cable, to a connector connecting portion provided on the inverter housing section side, and to be connected from there to the P-N terminal on the control substrate side, via a resin substrate in which a direct current power line is constituted by a terminal block and a wiring pattern, the filter circuit constituted by the coil and the smoothing capacitor provided on the resin substrate, a bus bar assembly, and the like.

Patent Literature 2 discloses a configuration in which a power source input port forming portion is formed, on a metallic inverter cover that seals an inverter housing space in which a circuit substrate is installed, the coil and the capacitor for use in the filter circuit being mounted on the circuit substrate, and a metallic terminal is resin-insert molded in the power source input port forming portion to integrally provide a resin-made power source connector, the power-source-side cable is connected to the power source connector, and the metallic terminal of the power source connector and the circuit substrate are connected by fixing the inverter cover to a housing. Patent Literature 3 discloses a configuration in which a power conversion substrate is fixed and installed in such a way that an elastic member is sandwiched between the power conversion substrate and the inner surface of a substrate cover, and the coil and the capacitor for use in the filter circuit are arranged on a surface opposing to a housing, a lower portion of the coil and the capacitor is inserted and installed into a housing-side concave portion.

CITATION LIST

Patent Literature

Patent Literature 1: Japanese Patent No. 4898931B
Patent Literature 2: Japanese Unexamined Patent Application Publication No. 2012-193660A
Patent Literature 3: Japanese Unexamined Patent Application Publication No. 2007-295639A

SUMMARY OF INVENTION

Technical Problem

However, it is required that the inverter device, as disclosed in Patent Literature 1, include the terminal block and the resin substrate, the bus bar, and the like on an input system of direct current power from the power-source-side cable, and connect the high-voltage electric components such as the coil and the smoothing capacitor for use in the filter circuit. For this reason, there are problems such as the reliability of the inverter device is difficult to be secured due to that an increase in the number of components of the inverter device leads to a complicated configuration, and an increase in cost and size, and, in addition, a connecting portion made by a bus bar is required.

On the other hand, Patent Literature 2 discloses the inverter device in which the configuration of the input system of direct current power is simplified, by mounting electric components for use in the filter circuit on the back of the circuit substrate, integrally providing, on the inverter cover, the power source connector for connecting with the power-source-side cable, and connecting the metallic terminal thereof to the circuit substrate when the inverter cover is attached. In Patent Literature 3, the inverter device in which electric components for use in the filter circuit are arranged and mounted on the back of the power conversion substrate is described. However, these inverter devices include the plurality of electric components for use in the filter circuit individually mounted at the positions apart from each other on the substrate, and are not intended to improve assembly easiness and productivity of the inverter devices by associating with the P-N terminal provided on the substrate, and integrally coupling and incorporating the plurality of electric components.

The present invention has been made in view of such circumstances, and an object of the present invention is to provide an inverter-integrated electric compressor which comprises an inverter device that can achieve a simplified configuration, a reduction in cost, and a reduction in size and weight, and which enables assembly easiness and assembly precision to be enhanced, and enables productivity to be improved.

Solution to Problem

An inverter-integrated electric compressor of the present invention employs the following means to solve the above problems.

In other words, the inverter-integrated electric compressor according to the present invention having an inverter device incorporated into and integrated with an inverter housing section provided on an outer circumference of a housing includes a P-N terminal provided on a main substrate of the inverter device, configured to receive high-voltage direct-current power and to allow a power-source-side cable to be connected thereto by inserting into the P-N terminal a connector provided at one end of the power-source-side cable; and a plurality of high-voltage electric components arranged and mounted on a back of an area where the P-N terminal is installed on the main substrate constituting a noise removing filter circuit on the main substrate. The plurality of high-voltage electric components are integrally coupled via fitting parts provided on the respective housing cases and are installed in a prescribed position on the back of the main substrate via positioning means provided on one of the housing cases.

With this configuration, the P-N terminal provided on the main substrate of the inverter device is configured to receive high-voltage direct-current power, and to allow the power-source-side cable to be connected thereto by inserting the connector provided at the one end of the power-source-side cable into the P-N terminal, and the plurality of high-voltage electric components arranged and mounted on the back of an area where the P-N terminal is installed on the main substrate constitute the noise removing filter circuit on the main substrate. As a result, the power-source-side cable can be configured to be directly connected without a terminal block or a bus bar, by inserting the connector provided at the one end of the power-source-side cable into the P-N terminal provided on the main substrate. Additionally, arranging and mounting the plurality of high-voltage electric components on the back of the installation area of the P-N terminal on the main substrate enables the noise removing filter circuit to be formed on the main substrate without a bus bar. Accordingly, omitting a terminal block or a bus bar that has been provided in the input system of direct current power, and reducing the number of components of the inverter device can achieve simplified configuration, reduced size and weight, and decreased cost. Additionally, decreasing the number of bus bar connections can achieve reduced man-hours and improved reliability. The plurality of high-voltage electric components are integrally coupled via the fitting parts provided on the respective housing cases, and are installed in a prescribed position on the back of the main substrate via the positioning means provided on one of the housing cases. As a result, the plurality of high-voltage electric components composed of the smoothing capacitor, the coil, and the like that are relatively heavy large-size components can be integrally coupled, and can be housed and installed in the inverter housing section while being positioned and incorporated on the back of the main substrate. Therefore, as compared to a case where the plurality of high-voltage electric components are individually incorporated, assembly easiness and assembly precision can be enhanced, and productivity can be improved.

Moreover, in the above inverter-integrated electric compressor, the plurality of high-voltage electric components include the smoothing capacitor and the coil which are housed in the respective housing cases made of resin. It is preferable that the housing cases be integrally incorporated and fixed via a screw on the back of the main substrate so that the plurality of high-voltage electric components are housed and installed in the inverter housing section.

With this configuration, the smoothing capacitor and the coil constituting the noise removing filter circuit are firmly fastened and fixed with the screw on the back of the main substrate via the respective housing cases so as to be able to be integrally incorporated. Therefore, not only assembly easiness and assembly precision can be improved, but also vibration-resistant strength against travel vibration and the like can be sufficiently secured.

Moreover, in any one of the above inverter-integrated electric compressors, it is preferable that the positioning means be a protrusion that is integrally formed protruding upward on the top surface of the fitting part of the housing case made of resin and fit into a positioning hole provided on the main substrate.

With this configuration, fitting the protrusion for the positioning means integrally formed with the fitting part on one of the resin-made housing cases into the positioning hole on the main substrate enables the integrally coupled plurality of high-voltage electric components to be positioned and incorporated into the main substrate at the same time. Therefore, integrating and positioning, and accurately incorporating the plurality of high-voltage electric components in a simplified manner at a low cost without increasing the number of components and assembly man-hours can improve assembly easiness of the inverter device.

Moreover, in any one of the above inverter-integrated electric compressors, it is preferable that the connector provided at one end of the power-source-side cable be provided in a position corresponding to the P-N terminal on an inner surface of a cover that seals the inverter housing section, and that connector be insertable into the P-N terminal when the cover is attached.

With this configuration, the inverter device is housed and installed in the inverter housing section, and thereafter the cover is attached to seal the inverter housing section. At that time, the connector provided on the inner surface of the cover is inserted into the P-N terminal, whereby the power-source-side cable can be connected to the P-N terminal of the inverter device. Accordingly, while the connection structure of the power-source-side cable can be made simple, and the connection process thereof can be simplified, the reliability thereof can be secured by employing connector connection.

Moreover, in any one of the above inverter-integrated electric compressors, it is preferable that one of the plurality of high-voltage electric components be arranged on the back of the main substrate so as to correspond to the installation position of the P-N terminal installed on the main substrate, and the high-voltage electric component be subjected to stress added to the main substrate upon the connector being inserted into the P-N terminal.

With this configuration, when the connector provided at one end of the power-source-side cable is inserted into the P-N terminal provided on the main substrate so that the power-source-side cable is connected, stress added to the main substrate is supported by the high-voltage electric component arranged on the back of the main substrate so as to correspond to the installation position of the P-N terminal, and as a result, the stress can be alleviated. Accordingly, a situation such as the main substrate or the components mounted thereon may be damaged due to stress caused by a press force upon connector being inserted can be surely eliminated.

Advantageous Effects of Invention

According to the present invention, such a configuration can be achieved that the power-source-side cable is directly connected, without a terminal block or a bus bar, by inserting the connector provided at one end of the power-source-side cable, into the P-N terminal provided on the main substrate. Additionally, arranging and mounting the plurality of high-voltage electric components on the back of the installation area of the P-N terminal on the main substrate enables the noise removing filter circuit to be formed on the main substrate without a bus bar. Accordingly, omitting a terminal block or a bus bar that has been provided in the input system of direct current power, and reducing the number of components of the inverter device can achieve simplified configuration, decreased cost, and reduced size and weight. Additionally, decreasing the number of bus bar connections can achieve reduced man-hours and improved reliability. Moreover, the plurality of high-voltage electric components constituted of the smoothing capacitor, the coil, and the like that are relatively heavy large-size components are integrally coupled so as to be able to be housed and installed in the inverter housing section while being positioned and incorporated on the back of the main substrate. Accordingly, as compared to a case where the plurality of high-voltage electric components are individually incorporated, assembly easiness and assembly precision can be enhanced, and productivity can be improved.

DESCRIPTION OF EMBODIMENTS

An embodiment of the present invention will be described below with reference to FIGS. 1 to 7.

Figure 1:
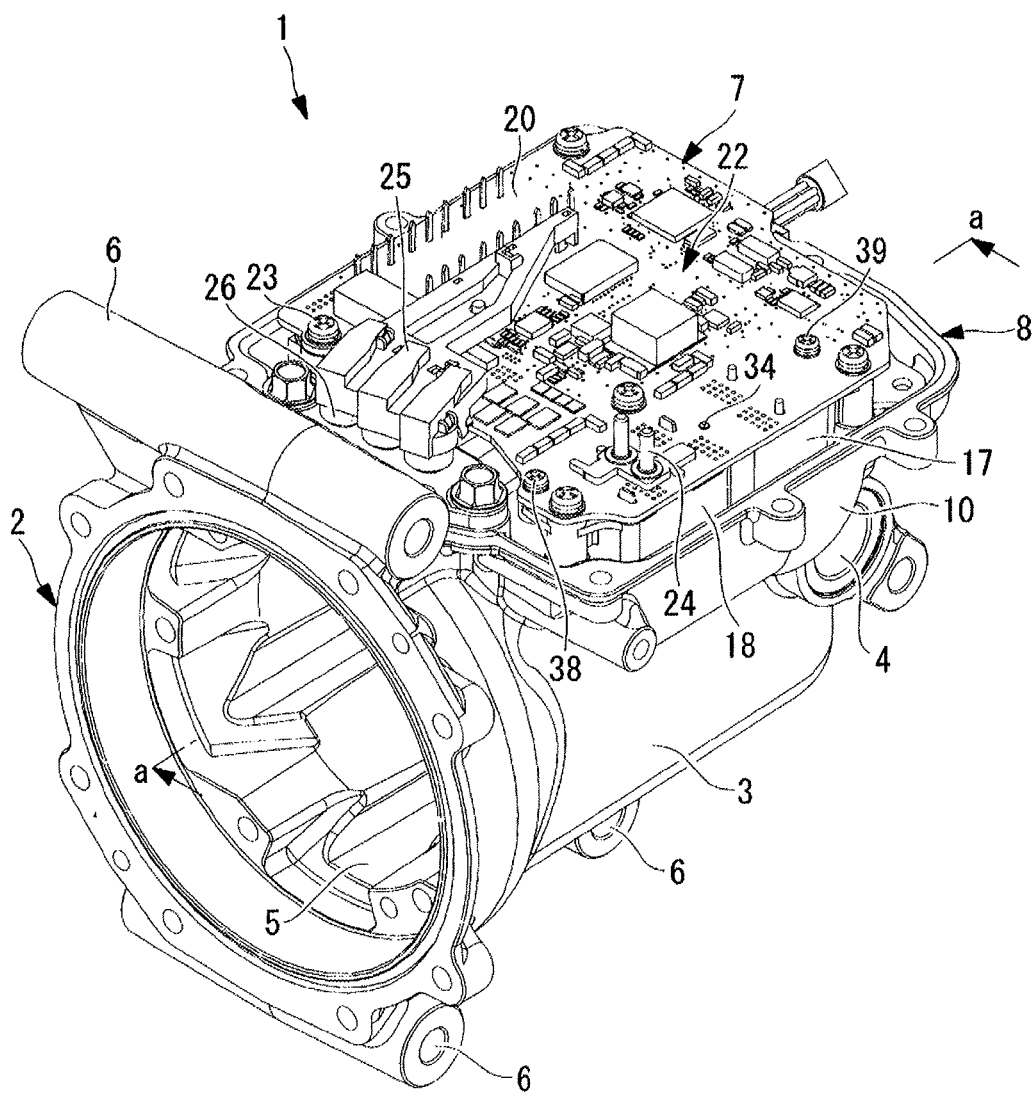
FIG. 1 is a perspective view illustrating a configuration of main components of an inverter-integrated electric compressor according to an embodiment of the present invention.
Figure 2:
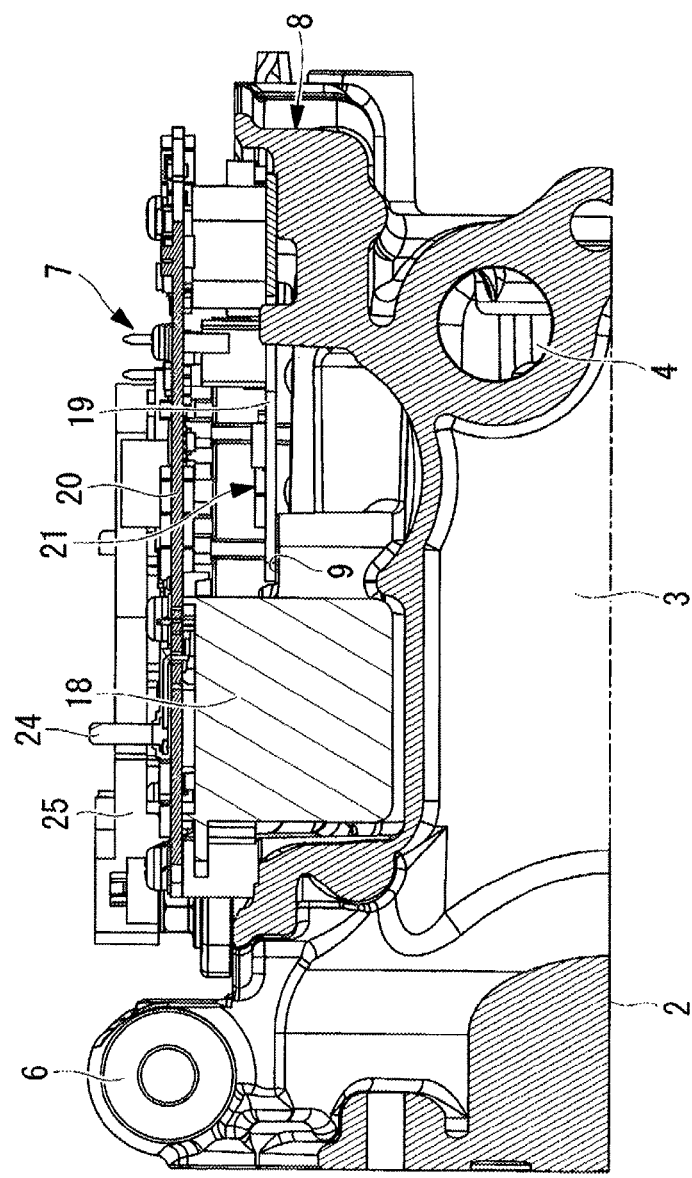
FIG. 2 is a longitudinal cross-sectional view corresponding to the line a-a in FIG. 1.
Figure 3:
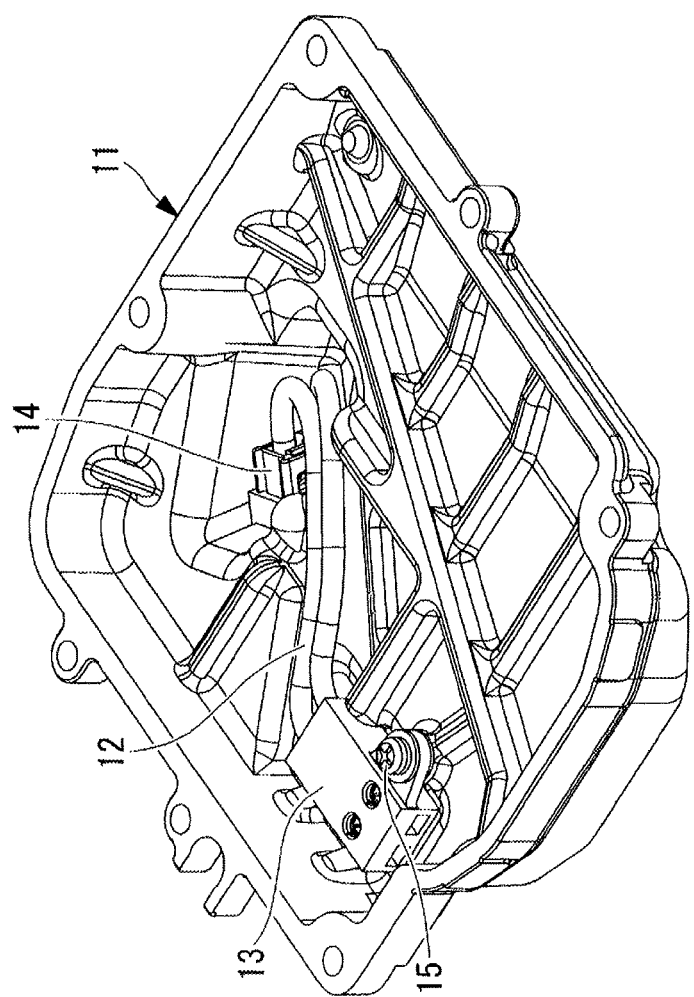
FIG. 3 is a perspective view of a back-side of a cover that seals an inverter housing section of the inverter-integrated electric compressor.
Figure 4:
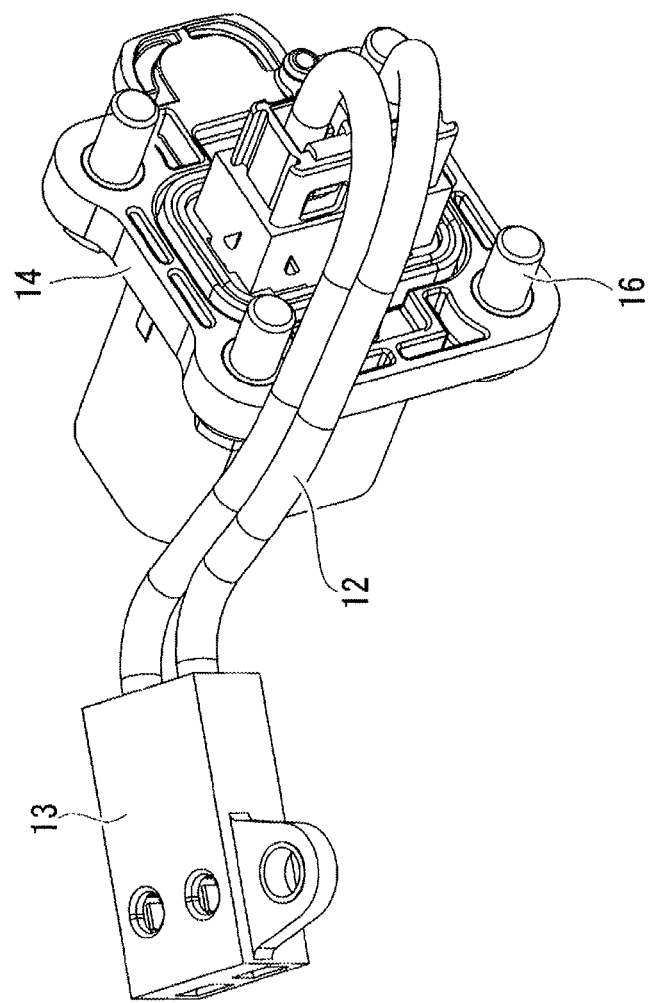
FIG. 4 is a perspective view of a single power source cable connected to the cover.

FIG. 1 illustrates a perspective view of main components of the inverter-integrated electric compressor according to one embodiment of the present invention, FIG. 2 illustrates a longitudinal cross-sectional view corresponding to the line a-a in FIG. 1, FIG. 3 illustrates a perspective view of a back-side of a cover that seals an inverter housing section, and FIG. 4 illustrates a perspective view of a single power source cable.

The inverter-integrated electric compressor 1 is provided with a cylindrical housing 2 that constitutes an outer shell. The housing 2 is constituted by a motor housing 3 for incorporating an electric motor (not illustrated) and a compressor housing (not illustrated) for incorporating a compression mechanism (not illustrated) being integrally coupled.

The inverter-integrated electric compressor 1 is configured so that the electric motor and compression mechanism incorporated in the housing 2 are linked through a rotary shaft, and the compression mechanism is driven by the electric motor being rotationally driven via an inverter device 7 described below, whereby a low-pressure refrigerant gas drawn into the motor housing 3 via an intake port 4 provided in the side wall on the rear end side of the motor housing 3 is drawn in via the periphery of the electric motor, compressed to a high pressure by the compression mechanism, and discharged inside the compressor housing, and then sent outside.

The motor housing 3 has a plurality of refrigerant flow paths 5 formed therein to allow refrigerant to flow in the axial direction along the inner circumferential surface thereof, and a plurality of legs 6 for installing the electric compressor 1 provided on the outer circumference thereof. An inverter housing section 8 is integrally formed on the outer circumference of the housing 2 (on the motor housing 3 side) for integrally incorporating the inverter device 7. The inverter housing section 8 is configured so as to have a substantially square shape in a plan view, to have the bottom surface thereof constitute a partially substantially flat pedestal surface 9 formed by a wall surface of the motor housing 3, and to have a flange portion 10 erected on the periphery thereof.

The inverter housing section 8 is configured to be sealed by attaching a cover 11 on the flange portion 10, as illustrated in FIG. 3, after the inverter device 7 is incorporated. On the inner surface side of the cover 11, a high-voltage cable (power-source-side cable) 12 is provided. The high-voltage cable 12 is provided with a connector 13 at one end thereof, and is provided with a connector terminal 14 at the other end thereof that is connected with the power-source-side cable. The connector 13 at the one end is fixed and installed onto the inner surface of the cover 11 by a screw 15, in a position corresponding to a P-N terminal 24 described below, provided on the main substrate 20. The connector terminal 14 at the other end is fixed and installed by a plurality of screws 16 from the exterior surface side while the terminal portion being protruded to the exterior surface side of the cover 11.

The high-voltage cable 12 is a part of the power-source-side cable, and is connected to a power source unit mounted on a vehicle via the power-source-side cable, and the connector 13 provided at one end thereof is connected to the P-N terminal 24 provided on the main substrate 20 of the inverter device 7, so that the high-voltage cable 12 is used to apply high-voltage direct-current power fed from the power source unit to the inverter device 7.

The inverter device 7 converts high-voltage direct-current power fed from the power source unit mounted on the vehicle into three-phase alternating-current power of required frequency to apply the three-phase alternating current power to the electric motor so that the electric motor is driven. The inverter device 7, as illustrated in FIG. 1 and FIG. 2, is integrated and incorporated into the inverter housing section 8, and is constituted by a plurality of high-voltage electric components such as a coil 17 and a smoothing capacitor 18 housed in housing cases, constituting a noise removing filter circuit, a sub substrate 19, the main substrate 20, and the like.

Figure 6:
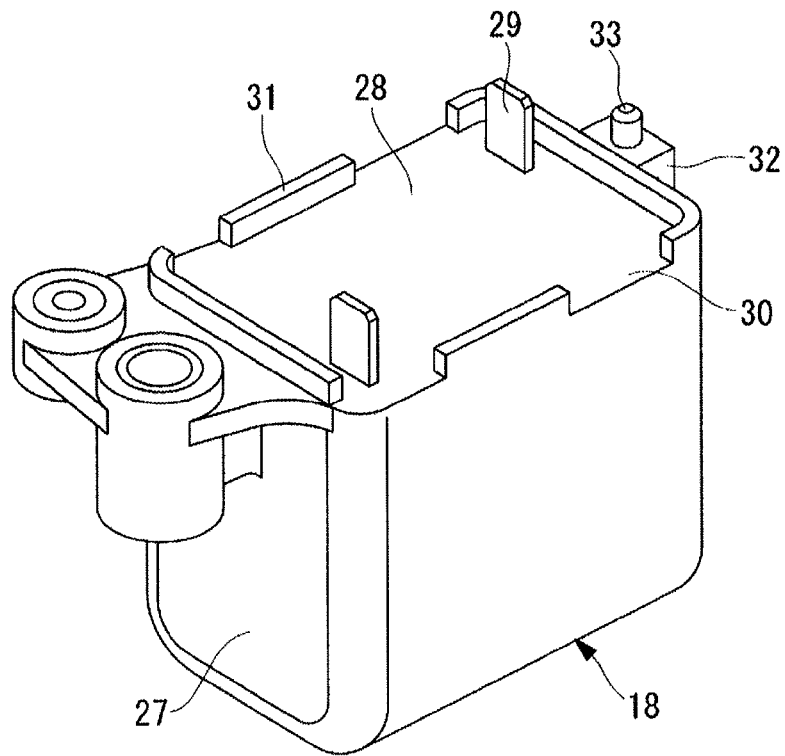
FIG. 6 is a perspective view of the high-voltage electric component (smoothing capacitor) arranged at a position opposing to a P-N terminal on the main substrate.

The inverter device 7 itself may be a publicly known device, but herein, for the purpose of integration, a device is used in which the plurality of electric components such as the coil 17 and the smoothing capacitor 18 constituting the filter circuit are connected by soldering to the main substrate 20. The smoothing capacitor 18 is configured to be generally housed in a case. As illustrated in FIG. 2 and FIG. 6, the smoothing capacitor 18 has a contour thereof formed into a rectangular shape (rectangular parallelepiped shape), with a top surface thereof formed into substantially flat planar shape. The electric components such as the smoothing capacitor 18 and the coil 17 (e.g., a common mode coil, a normal mode coil) housed in the cases are connected to a high-voltage line constituted by a wiring pattern of the main substrate 20, and constitute a publicly known filter circuit for noise rejection.

The sub substrate 19, on which a communication circuit 21 that is connected to a communication line extending from a host controller is mounted, is fixed and installed in contact with the pedestal surface 9 formed on a wall surface of the motor housing 3 which is the bottom surface of the inverter housing section 8. The sub substrate 19 is electrically connected with the main substrate 20.

In the main substrate 20, there is mounted a switching circuit (not illustrated) constituted by a plurality of switching elements such as IGBT that converts direct current power into three-phase alternating current power, and there is mounted a control circuit 22 such as a CPU that operates at low voltages for controlling the switching circuit and the like. The main substrate 20 is configured to control operation of the inverter device 7 based on a control signal from an ECU mounted on the vehicle side, and is fixed and installed inside the inverter housing section 8 via a plurality of bolts 23. The main substrate 20 has the top surface thereof provided with the P-N terminal 24 for receiving high-voltage direct-current power via the connector 13 through the high-voltage cable 12, and a UVW terminal 25 for outputting three-phase alternating current power of required frequency converted from direct current power.

The UVW terminal 25 is connected to a glass-sealed terminal 26 that penetrates the motor housing 3 and is installed in the inverter housing section 8, and is configured to apply three-phase alternating current power, via the glass-sealed terminal 26, to the electric motor installed in the motor housing 3.

The connector 13 provided on the cover 11 side so as to correspond to the P-N terminal 24 is inserted into the P-N terminal 24 so that the high-voltage line is connected, but when the connector 13 is inserted, a press force of more than the certain amount is required, and thus the stress thereof is likely to be exerted on the main substrate 20.

Figure 5:
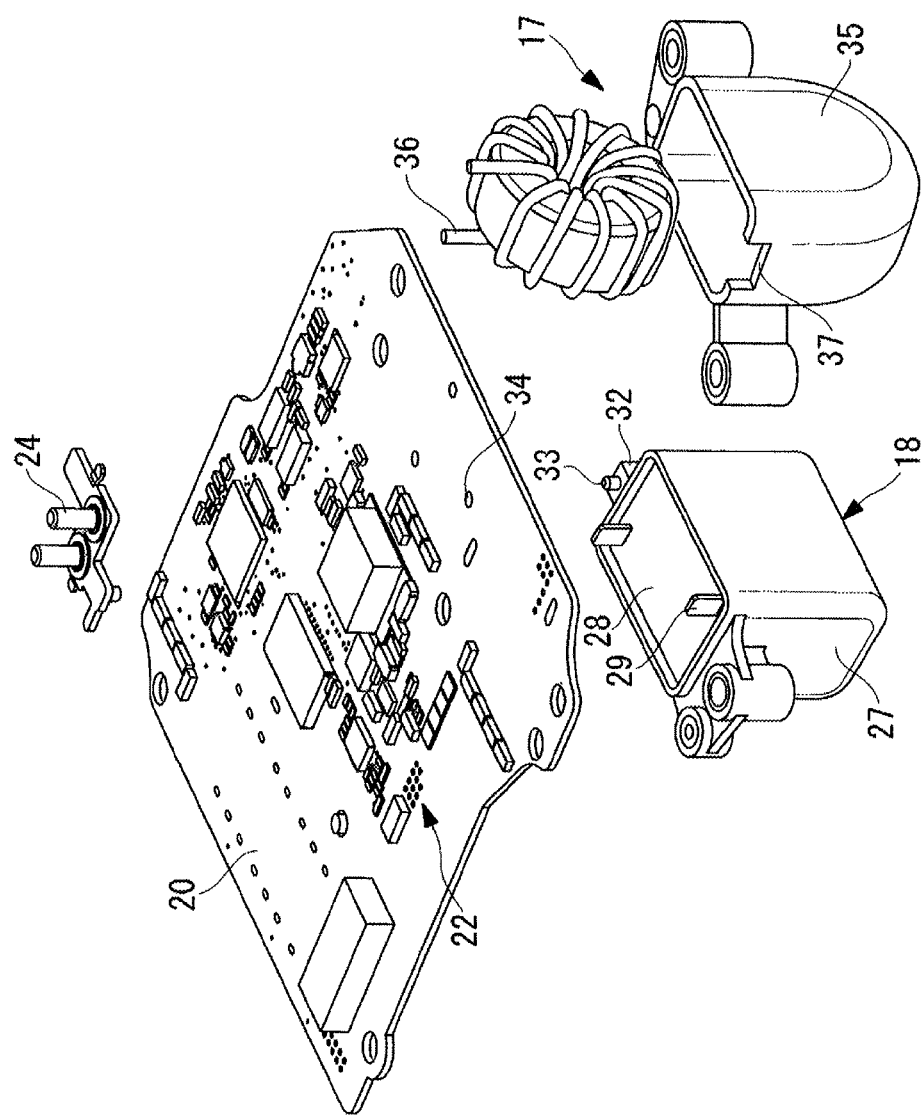
FIG. 5 is an exploded perspective view illustrating an arrangement relationship between a main substrate of the inverter device and a plurality of high-voltage electric components arranged on the back of the main substrate.

In the present embodiment, in order to support the stress exerted on the main substrate 20, the smoothing capacitor 18 and the coil 17 constituting the plurality of high-voltage electric components are provided side by side, as illustrated in FIG. 5, on the back of the area where the P-N terminal 24 is installed, and the smoothing capacitor 18 is arranged on the back of the main substrate 20 opposing to the installation position of the P-N terminal 24. The smoothing capacitor 18 has a contour in a rectangular shape (rectangular parallelepiped shape), and is configured so that the top surface thereof is subjected to the stress added to the main substrate 20.

The smoothing capacitor 18, as illustrated in FIG. 6, is housed in the resin-made housing case 27 with an upper end thereof being opened, and is fixed by filling the resin-made housing case 27 with a resin material 28. A pair of terminals 29 are protruded from the surface of the resin material 28, and are soldered onto the main substrate 20 so that the smoothing capacitor 18 is mounted onto the main substrate 20. On the periphery of rectangular upper end opening of the housing case 27 of the smoothing capacitor 18, a plurality of concave portions 30 and convex portions 31 are provided so that they are arranged one after the other and at least one convex portions 31 exist on each side.

The convex portions 31 are configured to have the top surfaces thereof support an underside area of the main substrate 20 opposing to a position where the P-N terminal 24 is installed, so that the stress exerted on the main substrate 20 is supported when the connector 13 is inserted into the P-N terminal 24. On the other hand, the concave portions 30 are configured to allow the resin material 28 to release therefrom when the resin material 28 filling the case 27 overflows during the manufacture of the smoothing capacitor 18, so that the resin material 28 is prevented from affecting dimensional accuracy of the top surfaces of the convex portions 31.

Figure 7:
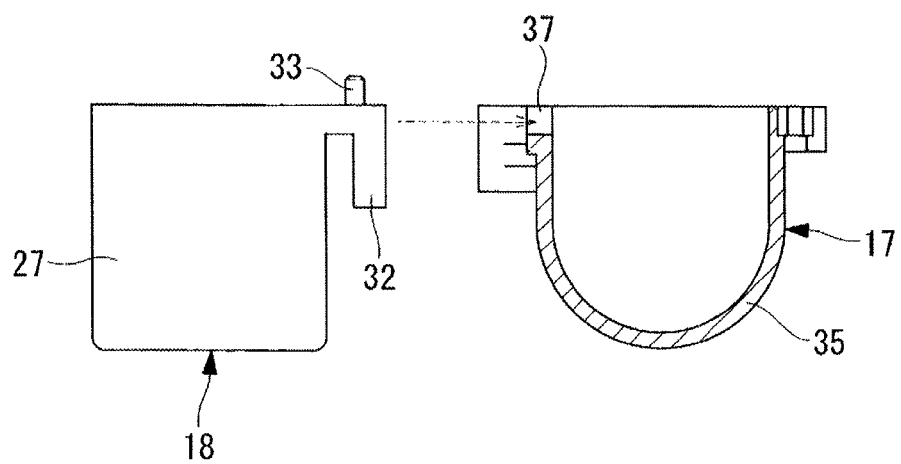
FIG. 7 is a schematic view illustrating a coupling configuration of the plurality of high-voltage electric components.

As illustrated in FIG. 7, a hook-like fitting convex portion (fitting part) 32, which extends sideway from one side of the periphery of the upper end opening and is bent downward, is integrally formed on the housing case 27 of the smoothing capacitor 18. The fitting convex portion 32 is configured to integrally couple the smoothing capacitor 18 with the coil 17 that is another high-voltage electric component, and to fit into a concave fitting concave portion (fitting part) 37 provided in a housing case 35 of the coil 17 described below so that the two are integrally coupled.

The protrusion (positioning means) 33 for positioning the smoothing capacitor 18 and the coil 17 when incorporated into the main substrate 20 is integrally formed protruding upward on the top surface of the fitting convex portion 32. The protrusion 33 is configured to fit into the positioning hole 34 provided on the main substrate 20, and to position the smoothing capacitor 18 and the coil 17 on the main substrate 20 in a prescribed incorporation position.

On the other hand, the coil 17 that is another high-voltage electric component is also configured to be housed in the resin-made housing case 35 and fixed with the resin material. A both-end terminal 36 of the coil 17 is soldered to the main substrate 20 so that the coil 17 is mounted on the main substrate 20. On the housing case 35 of the coil 17, as illustrated in FIG. 7, there is provided the concave fitting concave portion (fitting part) 37 configured to have the hook-like fitting convex portion (fitting part) 32, which is provided on the smoothing capacitor 18 side, fitted thereinto so that the coil 17 is integrally coupled with the smoothing capacitor 18.

Then, the respective housing cases 27, 35 of the coil 17 and the smoothing capacitor 18 are fastened and fixed via the screws 38, 39 (see FIG. 1) at the prescribed positions on the back of the main substrate 20. Accordingly, the coil 17 and the smoothing capacitor 18 are housed in the inverter housing section 8 while being integrally incorporated in the main substrate 20, and the bottom parts thereof are fixed and installed on the bottom surface of the inverter housing section 8 with silicon adhesive or the like.

As described above, in the present embodiment, the coil 17 and the smoothing capacitor 18 that are the plurality of high-voltage electric components constituting the noise removing filter circuit of the inverter device 7 are arranged on the back of the main substrate 20 so as to correspond to an area where the P-N terminal 24 is installed, with respect to the P-N terminal 24 provided on the main substrate 20, and the coil 17 and the smoothing capacitor 18 are mounted on the main substrate 20 so that the noise removing filter circuit is provided on the main substrate 20.

The coil 17 and the smoothing capacitor 18 that are the plurality of high-voltage electric components are integrally coupled via the fitting convex portion 32 and the fitting concave portion 37 provided on the respective housing cases 27, 35, and are positioned and incorporated in a prescribed position on the back of the main substrate 20 via the positioning protrusion 33 provided on the housing case 27 side, so that the coil 17 and the smoothing capacitor 18 can be housed and installed in the inverter housing section 8 integrally with the main substrate 20.

In this manner, according to the present embodiment, inserting the connector 13 provided on one end side of the power-source-side cable 12 into the P-N terminal 24 provided on the main substrate 20 allows the power-source-side cable 12 to be directly connected without a terminal block or bus bar. Additionally, arranging and mounting the coil 17 and the smoothing capacitor 18 that are the plurality of high-voltage electric components, on the back of an installation area of the P-N terminal 24 on the main substrate 20 allows the noise removing filter circuit to be formed on the main substrate 20 without a bus bar or the like.

Consequently, omitting a terminal block or a bus bar provided in an input system of direct-current power to reduce the number of components in the inverter device 7 can simplify the configuration, reduce cost, and reduce size and weight. Additionally, decreasing the number of bus bar connections can achieve reduced man-hours and improved reliability.

Moreover, the plurality of high-voltage electric components 17, 18 are integrally coupled via the fitting convex portion 32, the fitting concave portion 37 provided on the respective housing cases 27, 35, and are installed in a prescribed position on the back of the main substrate 20 via the positioning protrusion 33 provided on the housing case 27 which is one of the housing cases. For this reason, the high-voltage electric components such as the smoothing capacitor 18 and the coil 17 that are relatively heavy large-size components, can be integrally coupled, and can be housed and installed in the inverter housing section 8 while being positioned and incorporated on the back of the main substrate 20. Accordingly, as compared to a case where the plurality of high-voltage electric components 17, 18 are individually incorporated, assembly easiness and assembly precision can be enhanced, and productivity can be improved.

Furthermore, the plurality of high-voltage electric components 17, 18 are the smoothing capacitor 18 and the coil 17 housed in the respective resin-made housing cases 27, 35, and the housing cases 27, 35 are integrally incorporated and fixed via the screws 38, 39 on the back of the main substrate 20, so that the smoothing capacitor 18 and the coil 17 are housed and installed in the inverter housing section 8. For this reason, the smoothing capacitor 18 and the coil 17 constituting the noise removing filter circuit are firmly fastened and fixed via the screws 38, 39 on the back of the main substrate 20 via the respective housing cases 27, 35, to thereby enable the smoothing capacitor 18 and the coil 17 to be integrally incorporated. Accordingly, not only assembly easiness and assembly precision can be improved, but also vibration-resistant strength against travel vibration and the like can be sufficiently secured.

Moreover, in the present embodiment, the positioning protrusion 33 is configured to be integrally formed protruding upward on the top surface of the fitting convex portion 32 of the resin-made housing case 27, and to fit into the positioning hole 34 provided on the main substrate 20. For this reason, fitting the protrusion 33 integrally formed with the fitting convex portion 32 on the resin-made housing case 27, which is one of the housing cases, into the positioning hole 34 on the main substrate 20 enables the coil 17 and the smoothing capacitor 18 that have been integrally coupled to be positioned at the same time and to be incorporated into the main substrate 20. Accordingly, positioning integrally and incorporating accurately the plurality of high-voltage electric components 17, 18 in a simplified manner at a low cost without increasing the number of components and assembly man-hours can improve assembly easiness of the inverter device 7.

Furthermore, in the present embodiment, the connector 13 provided at one end of the power-source-side cable 12 is provided on the inner surface side in a position corresponding to the P-N terminal 24 on the cover 11 that seals the inverter housing section 8, and when the cover 11 is attached, the connector 13 can be inserted into the P-N terminal 24. For this reason, after the inverter device 7 has been housed and installed in the inverter housing section 8, when the cover 11 is attached and the inverter housing section 8 is sealed, by inserting at the same time the connector 13 provided on the inner surface side of the cover 11 into the P-N terminal 24, the power-source-side cable 12 can be connected to the P-N terminal 24 of the inverter device 7. Accordingly, connection structure of the power-source-side cable 12 can be simplified, and the connection process can be simplified, and the reliability thereof can be secured by employing connector connection.

Moreover, in the present embodiment, the smoothing capacitor 18, which is one of the plurality of high-voltage electric components, is arranged on the back of the main substrate 20 so as to correspond to an installation position of the P-N terminal 24 installed on the main substrate 20, to thereby subject the smoothing capacitor 18 to stress added to the main substrate 20 when the connector 13 is inserted into the P-N terminal 24. For this reason, when the connector 13 provided at one end of the power-source-side cable 12 is inserted into the P-N terminal 24 provided on the main substrate 20 to connect the power-source-side cable 12, the smoothing capacitor 18 arranged on the back of the main substrate 20 so as to correspond to the installation position of the P-N terminal 24 supports the stress added to the main substrate 20; thus, the stress can be alleviated. Accordingly, a situation such as the main substrate 20 or the components mounted thereon may be damaged due to stress caused by a press force upon connector 13 being inserted can be surely eliminated.

Note that the present invention is not limited to the invention according to the embodiment as described above, and changes can be made as appropriate without departing from the gist thereof. For example, in the above embodiment, an example in which the smoothing capacitor 18 is taken as the high-voltage electric component arranged on the back of the main substrate 20 so as to correspond to the installation position of the P-N terminal 24 on the main substrate 20 has been described, but the present invention is not limited to this. The coil 17 such as a common mode coil, or a normal mode coil housed in the housing case 35 may be configured to be supported by the housing case 35.

Furthermore, the fitting parts 32, 37 that integrally couple the coil 17 and the smoothing capacitor 18 are integrally formed with the housing cases 27, 35, respectively, but the fitting parts 32, 37 need not be, as in the above embodiment, the hook-like fitting convex portion 32 and the concave fitting concave portion 37, and any structure may be used as long as the both can be coupled thereby. Furthermore, the protrusion 33 that is positioning means provided on the top surface of the fitting convex portion 32 may be provided on either the fitting parts 32, 37 or the housing cases 27, 35, and does not necessarily need to be provided on the top surface of the fitting convex portion 32.

Moreover, the power-source-side cable has been described in which the high-voltage cable 12 is installed in the cover 11, and a cable on the power source side is connected thereto, but needless to say, it may be constituted by one cable. Furthermore, the inverter device 7 may have any configuration as long as it is configured so that the P-N terminal 24 is provided on the main substrate 20 and connected with the power source cable. For example, the inverter device 7 may be configured as an integrated unit by a resin structure, and then incorporated into the inverter housing section 8.

REFERENCE SIGNS LIST

1 Inverter-integrated electric compressor
2 Housing
3 Motor housing
7 Inverter device
8 Inverter housing section
11 Cover
12 High-voltage cable (power-source-side cable)
13 Connector
17 Coil (high-voltage electric component)
18 Smoothing capacitor (high-voltage electric component)
20 Main substrate
24 P-N terminal
27 Housing case
32 Fitting convex portion (fitting part)
33 Protrusion (positioning means)
34 Positioning hole
35 Housing case
37 Fitting concave portion (fitting part)
38, 39 Screw

The invention claimed is:

1. An inverter-integrated electric compressor having an inverter device incorporated into and integrated with an inverter housing section provided on an outer circumference of a housing, the inverter-integrated electric compressor comprising:
   a P-N terminal provided on a main substrate of an inverter device, the P-N terminal being configured to receive high-voltage direct-current power, and to allow a power-source-side cable to be connected thereto by inserting a connector provided at one end of the power-source-side cable into the P-N terminal; and
   a plurality of high-voltage electric components arranged and mounted on a back of an area where the P-N terminal is installed on the main substrate, the plurality of high-voltage electric components constituting a noise removing filter circuit on the main substrate;
   the plurality of high-voltage electric components being housed in a first housing case and a second housing case, being integrally coupled via a hook-like fitting convex portions provided on the first housing case and a concave fitting concave portion provided on the second housing case, and being installed in a prescribed position on the back of the main substrate via a protrusion provided on one of the housing cases, the protrusion being integrally formed protruding upward on a top surface of the fitting portion of the resin-made housing case, and being configured to lit into a positioning hole provided on the main substrate.

2. The inverter-integrated electric compressor according to claim 1, wherein
   the plurality of high-voltage electric components are a smoothing capacitor and a coil, both being housed in the respective resin-made housing cases, and the housing cases are integrally incorporated and fixed via a screw on the back of the main substrate so that the plurality of high-voltage electric components are housed and installed in the inverter housing section.

3. The inverter-integrated electric compressor according to claim 1, wherein
   the connector provided at the one end of the power-source-side cable is provided in a position corresponding to the P-N terminal on an inner surface of a cover that seals the inverter housing section, and is configured to be insertable into the P-N terminal upon the cover being attached.

4. The inverter-integrated electric compressor according to claim 1, wherein
   one of the plurality of high-voltage electric components is arranged on the back of the main substrate so as to correspond to an installation position of the P-N terminal installed on the main substrate, and the high-voltage electric component is subjected to stress added to the main substrate upon the connector being inserted into the P-N terminal.

* * * * *